No. 706,368. Patented Aug. 5, 1902.
H. WEBB.
MACHINE FOR CUTTING VEGETABLE ROOTS.
(Application filed Apr. 8, 1901.)
(No Model.)
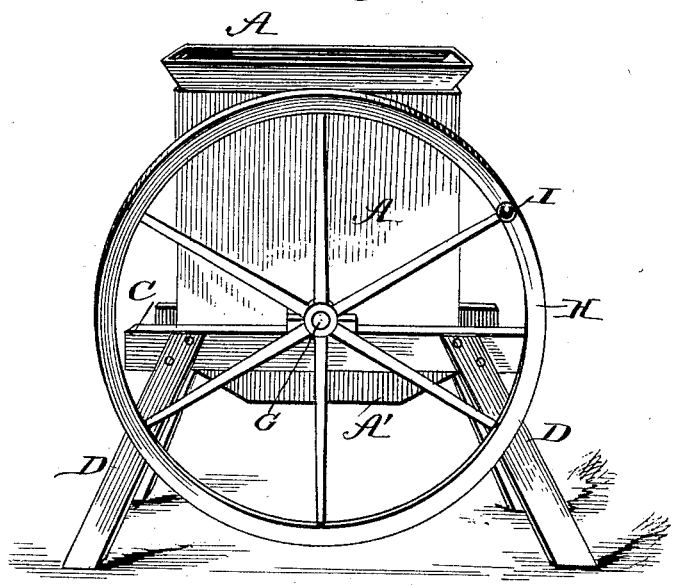
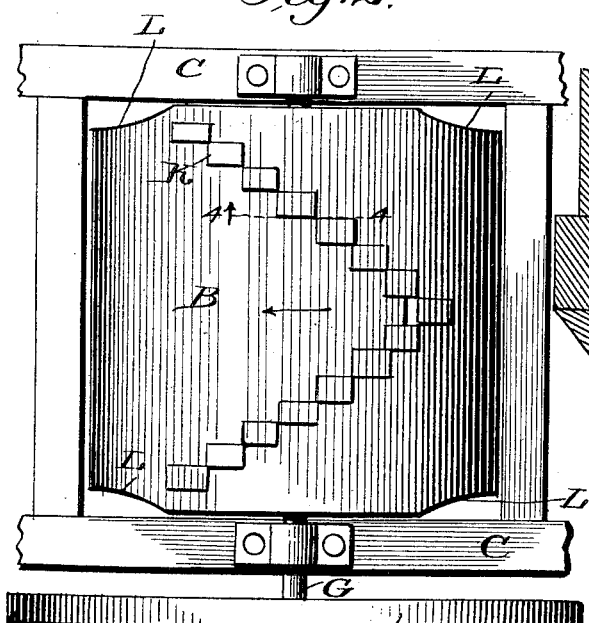
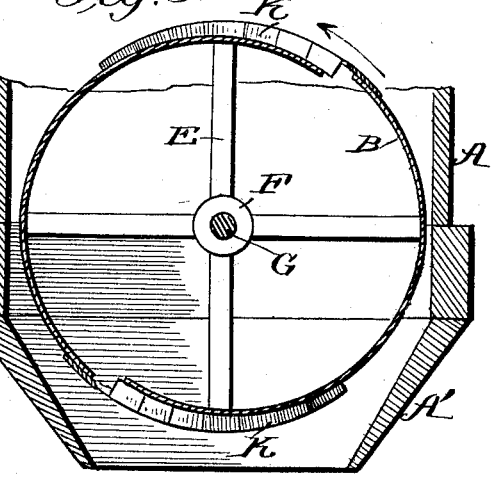
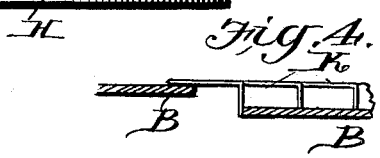
WITNESSES:
Jos. A. Ryan
Amos W. Hart
INVENTOR
Henry Webb.
BY Munn & Co
ATTORNEYS

UNITED STATES PATENT OFFICE.

HENRY WEBB, OF ASHTON, MICHIGAN.

MACHINE FOR CUTTING VEGETABLE-ROOTS.

SPECIFICATION forming part of Letters Patent No. 706,368, dated August 5, 1902.

Application filed April 8, 1901. Serial No. 54,941. (No model.)

*To all whom it may concern:*

Be it known that I, HENRY WEBB, a citizen of the United States, residing at Ashton, in the county of Osceola and State of Michigan, have made certain new and useful Improvements in Machines for Cutting Vegetable-Roots, of which the following is a specification.

My invention is an improved apparatus for cutting up vegetable-roots; and the chief or distinguishing feature of the same is the employment of a hollow rotary drum having an eccentric portion and a series of cutters arranged on the periphery of the same in a peculiar manner, whereby advantages are attained, as hereinafter set forth.

A further feature of my invention consists in providing the ends of the drums with notches or cut-away portions, whereby discharge of the pieces or slices of the roots is effected, as hereinafter set forth.

In the accompanying drawings, Figure 1 is a perspective view of my improved apparatus. Fig. 2 is a plan view of the same, the box or hopper being removed. Fig. 3 is a vertical section of the main portion of the apparatus. Fig. 4 is a detail sectional view on the line 4 4 of Fig. 2.

The hopper A, containing the rotary drum B, is supported upon a frame C, having legs D. Thus the whole apparatus is easily portable. The drum or cylinder B is constructed of sheet metal and provided with radial spokes or arms E, fixed on a hub F, which is keyed upon the rotary shaft G. The latter projects at one side of the frame C, (see Fig. 2,) and the balance-wheel H is mounted thereon and provided with a handle I. The hopper A is preferably rectangular in its upper portion, while the lower portion A' converges, as shown in Fig. 3. The details of the construction of the drum or cylinder B are as follows: It is provided with a series of openings having cutters K, which are arranged upon divergent lines and are practically at a right angle to each other—that is to say, as illustrated in Fig. 2 the central opening K of the two series is located equidistant from the ends of the drum B and the remaining cutters are arranged stepwise in relation to each other, one being in advance of but lateral to the other. Each of the cutters has a rightangular form, as shown in Fig. 4, and they are secured by soldering or brazing or any other preferred means to the periphery of the drum. It will be noted in Fig. 3 that those portions of the drum to which the cutters are applied are not truly concentric with the axis G, but are slightly eccentric thereto, so that each cutter gradually decreases in height or depth from the outer ends of the right angle to the center or apex of the same. Each cutter K occupies and practically covers an opening in the drum, and its front edge is sharpened, so that as the drum is revolved in direction of the arrow, Figs. 2 and 3, a root placed in the hopper between the drum and the left-hand wall of the same will be acted on by said cutters and gradually worked up into small pieces. It will be noted that in consequence of the differential projection of the cutters from the drum the outer ones of the two series will cut smaller pieces than the next, and so on, the largest or thickest piece being cut out by the central knives. Thus the knives which are located at the center and adjacent thereto do the most effective work, and this arrangement and result correspond with the tendency of the roots placed in the hopper A to accumulate in the greatest quantity near the center of the latter. In brief, the most effective cutting is done along the central line or portion of the drum. The pieces of the roots severed by the cutters K pass through the openings beneath the latter and fall into the drum, from which they are discharged at its ends. To provide for this, the ends of the drum are cut away, as indicated at L. (See Fig. 2.) The cut-away portions or notches are at diametrically opposite points and intermediate of the two sets of cutters on the periphery of the drum. The pieces discharging from the drum at its notched ends are delivered from the converging bottom of the hopper (see Fig. 3) into any suitable receptacle provided for the purpose. It will be seen that independently of the advantage of the arrangement of the cutters K, before stated, I avoid weakening the drum transversely, as would be the case if a continuous slot were formed straight across the same or even if a series of slots were formed in such line, and I am thus enabled to use a lighter and cheaper drum than would be otherwise practicable.

The hopper A is made removable, and the shaft G of the drum is fitted in a bearing, from which it may also be readily removed. The knives or cutters K may be sharpened by filing and grinding, which operation is facilitated by their arrangement flush with a portion of the periphery of the drum.

Having thus described my invention, what I claim as new, and desire to secure by Letters Patent, is—

1. In a vegetable-cutter, a rotary drum having a portion of its periphery curved gradually inward and thus made eccentric, and a series of openings located at the edges of such eccentric portion and a series of cutters arranged stepwise over said openings and differing in height, substantially as shown and described.

2. In a vegetable-cutter, a rotary drum, having a series of peripheral openings arranged on divergent lines, and cutters which are right angular in form and arranged over said openings, substantially as shown and described.

3. In a vegetable-cutter, the rotary drum, provided with peripheral openings, and cutters arranged on divergent lines, the ends of the drum being notched as described to provide for discharge of the severed pieces of the roots, substantially as shown and described.

In testimony whereof I have signed my name to this specification in the presence of two subscribing witnesses.

HENRY WEBB.

Witnesses:
FRANK BURGE,
P. A. VICKERY.